(12) United States Patent
Wang et al.

(10) Patent No.: US 7,631,307 B2
(45) Date of Patent: Dec. 8, 2009

(54) USER-PROGRAMMABLE LOW-OVERHEAD MULTITHREADING

(75) Inventors: Perry H. Wang, San Jose, CA (US); Hong Wang, Fremont, CA (US); John P. Shen, San Jose, CA (US); Ashok N. Seshadri, Santa Clara, CA (US); Anthony N. Mah, Dublin, CA (US); William R. Greene, Fort Collins, CO (US); Ravi K. Chandran, San Jose, CA (US); Piyush Desai, Pleasanton, CA (US); Steve Shih-wei Liao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 10/728,649

(22) Filed: Dec. 5, 2003

(65) Prior Publication Data

US 2005/0125802 A1    Jun. 9, 2005

(51) Int. Cl.
*G06F 9/46* (2006.01)
*G06F 3/00* (2006.01)
*G06F 15/00* (2006.01)

(52) U.S. Cl. ............ 718/100; 718/108; 718/102; 718/103; 719/318; 712/228

(58) Field of Classification Search .......... 718/1, 718/100, 105, 108, 102, 103; 719/318; 712/23, 712/228
See application file for complete search history.

(56) References Cited

U.S. PATENT DOCUMENTS

| | | | | |
|---|---|---|---|---|
| 4,539,637 A | * | 9/1985 | DeBruler | 719/312 |
| 5,179,685 A | * | 1/1993 | Nojiri | 712/41 |
| 5,247,676 A | * | 9/1993 | Ozur et al. | 719/328 |
| 5,390,329 A | * | 2/1995 | Gaertner et al. | 718/108 |
| 6,098,169 A | * | 8/2000 | Ranganathan | 712/227 |
| 6,195,676 B1 | * | 2/2001 | Spix et al. | 718/107 |
| 6,401,155 B1 | * | 6/2002 | Saville et al. | 710/266 |

(Continued)

FOREIGN PATENT DOCUMENTS

WO    WO 99/21081    4/1999

OTHER PUBLICATIONS

Marcuello, Pedro and Gonzalez, Antonio, "Thread-Spawning Schemes for Speculative Multithreading", IEEE, Proceedings of the Eighth International Symposium on High-Performance Computer Architecture, 2002, pp. 1-10.*

*Primary Examiner*—Meng-Ai An
*Assistant Examiner*—Kenneth Tang
(74) *Attorney, Agent, or Firm*—David P. McAbee

(57) ABSTRACT

A virtual multithreading hardware mechanism provides multi-threading on a single-threaded processor. Thread switches are triggered by user-defined triggers. Synchronous triggers may be defined in the form of special trigger instructions. Asynchronous triggers may be defined via special marking instructions that identify an asynchronous trigger condition. The asynchronous trigger condition may be based on a plurality of atomic processor events. Minimal context information, such as only an instruction pointer address, is maintained by the hardware upon a thread switch. In contrast to traditional simultaneous multithreading schemes, the virtual multithreading hardware provides thread switches that are transparent to an operating system and that may be performed without operating system intervention.

12 Claims, 5 Drawing Sheets

U.S. PATENT DOCUMENTS

| | | | |
|---|---|---|---|
| 6,560,626 B1 * | 5/2003 | Hogle et al. | 718/102 |
| 7,010,672 B2 * | 3/2006 | Ahmad et al. | 712/227 |
| 7,047,533 B2 * | 5/2006 | Circenis | 719/318 |
| 7,228,348 B1 * | 6/2007 | Farley et al. | 709/224 |
| 2002/0026502 A1 * | 2/2002 | Phillips et al. | 709/219 |
| 2002/0055964 A1 | 5/2002 | Luk et al. | |
| 2002/0138706 A1 * | 9/2002 | Hugly | 711/163 |
| 2002/0144083 A1 * | 10/2002 | Wang et al. | 712/23 |
| 2003/0018686 A1 | 1/2003 | Kalafatis et al. | |
| 2003/0061445 A1 | 3/2003 | Birk et al. | |
| 2003/0226001 A1 * | 12/2003 | Moyer et al. | 712/228 |
| 2005/0044323 A1 * | 2/2005 | Hass | 711/122 |
| 2005/0050395 A1 * | 3/2005 | Kissell | 714/38 |
| 2005/0107986 A1 * | 5/2005 | Jones et al. | 702/186 |

\* cited by examiner

Context switch A:

Context switch B:

USER-PROGRAMMABLE LOW-OVERHEAD MULTITHREADING

BACKGROUND

1. Technical Field

The present disclosure relates generally to information processing systems and, more specifically, to spawning and management of low-overhead concurrent threads.

2. Background Art

An approach that has been employed to improve processor performance is known as "multithreading." In software multithreading, an instruction stream is split into multiple instruction streams that can be executed in parallel. In one approach, multiple processors in a multi-processor system may each act on one of the multiple threads concurrently.

In another approach, known as time-slice multithreading, a single processor switches between threads after a fixed period of time. In still another approach, a single processor switches between threads upon occurrence of a trigger event, such as a long latency cache miss. The latter approach is known as switch-on-event multithreading.

Traditionally, the trigger event for switch-on-event multithreading is hardwired. However, it would be desirable for the programmer or user to specify any of a variety of triggering events to trigger a thread switch on a single processor. Embodiments of the method and apparatus disclosed herein address this and other concerns related to multithreading.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method, apparatus and system for providing low-overhead concurrent helper threads.

DETAILED DESCRIPTION

Described herein are selected embodiments of a system, apparatus and method for user-programmable spawning of one or more low-overhead concurrent helper threads. In the following description, numerous specific details such as processor types, types of processor events, manners of detecting processor events, and control flow ordering have been set forth to provide a more thorough understanding of the present invention. It will be appreciated, however, by one skilled in the art that the invention may be practiced without such specific details. Additionally, some well-known structures, circuits, and the like have not been shown in detail to avoid unnecessarily obscuring the present invention.

In processors that provide hardware support for multithreading, such as those that support an approach referred to as simultaneous multithreading ("SMT"), a single physical processor is made to appear as multiple logical processors to operating systems and user programs. For SMT, multiple threads can be active and execute concurrently on a single processor without switching. That is, each logical processor maintains a complete set of the architecture state, but many other resources of the physical processor, such as caches, execution units, branch predictors, control logic and buses are shared. Instructions from the multiple threads may execute concurrently, with at least one instruction from each thread being executed during the same time frame.

For processors that do not provide the hardware features to support SMT, it may nonetheless be desirable to implement multithreading such that a second thread may utilize execution resources of the processor when a main thread has encountered a trigger event, such as a long-latency instruction. For instance, if a processor executes a load instruction that causes a cache miss, a second thread may be spawned to perform data prefetching for a future anticipated cache miss of the first thread during the time that the first thread is latent while waiting for load data to be fetched.

Figure 1:
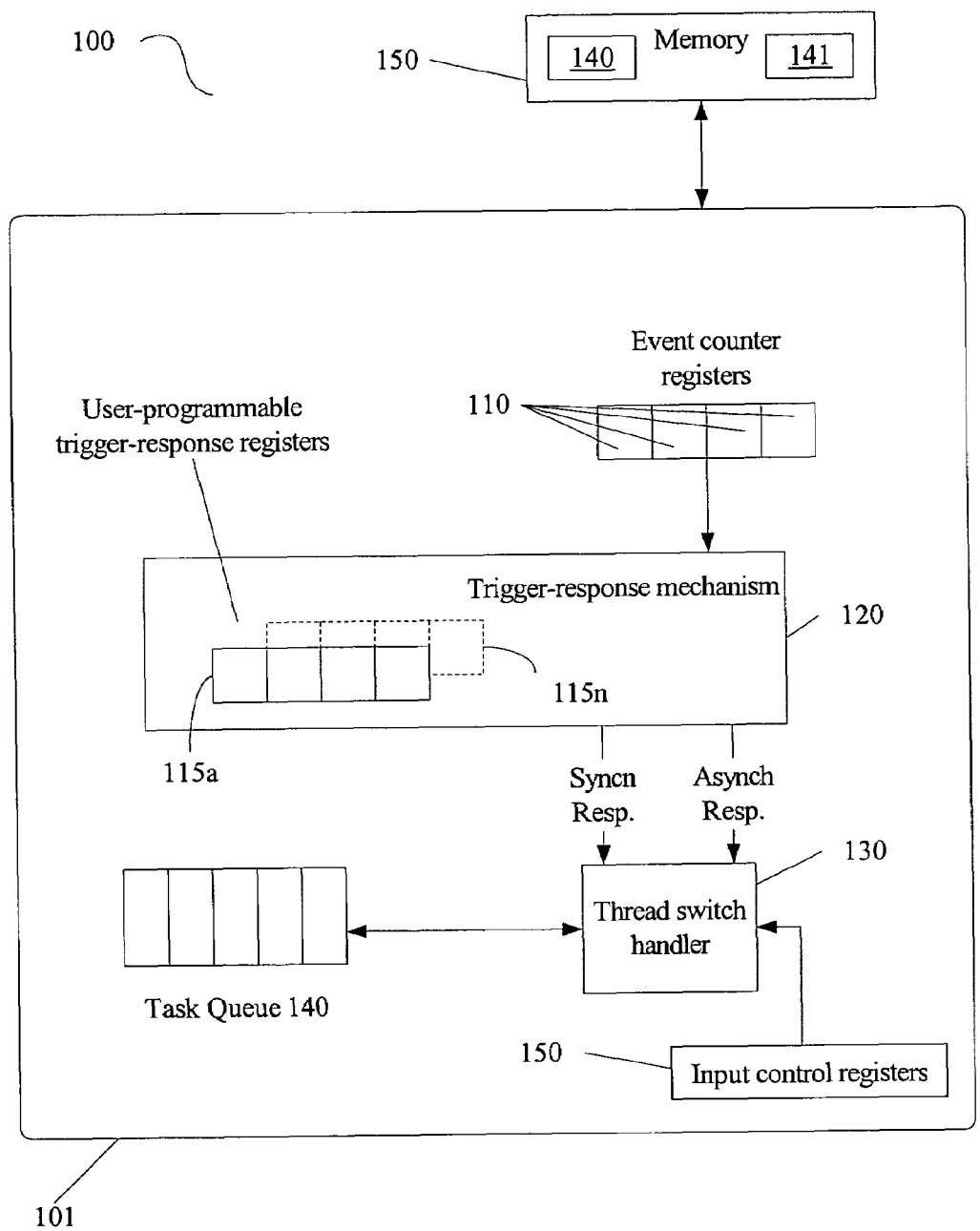
FIG. 1 is a block diagram of at least one embodiment of a processing system capable of utilizing disclosed techniques.

FIG. 1 is a block diagram illustrating a processor 101 that includes virtual multithreading hardware to provide user-programmable low-overhead multithreading. That is, the processor 101 provides user-level asymmetric multithreading with reduced context size for the additional thread. In contrast to processors that support traditional switch-on-event multithreading, the processor 101 illustrated in FIG. 1 allows one or more user-specified trigger events to effect spawning of a helper thread.

FIG. 1 illustrates that the virtual multithreading hardware of the processor 101 includes a trigger-response mechanism 120 and a thread switch handler 130. The thread switch handler 130 saves and restores certain minimal architectural state information upon a context switch to or from a low-overhead thread. The trigger-response mechanism 120 determines that a user-defined thread switch criteria has been met, and generates an appropriate response to cause the desired thread switch to occur.

The multithreading scheme supported by processor 101 is asymmetric at least in the sense that the context information saved for helper threads is much smaller than context information maintained for the main thread. The amount of context information saved for a thread switch is referred to as "weight" of a context switch. For at least one embodiment, the weight of the context switch is directly programmable. That is, the extent of the architectural state to be saved in queue 104 may be programmed via control registers 150. This context-weight-programmability is in contrast to traditional switch-on-event multithreading.

As used herein, the term "helper" thread is intended to encompass a thread that executes concurrently with the main thread. As used herein, "concurrently" indicates that both threads are active at the same time, in that resources of a processing system concurrently process work for each thread. Typically, a helper thread pre-performs work that the main thread is anticipated to utilize later in the main thread's instruction stream. A helper thread may be spawned when the main thread incurs a trigger event that causes the main thread to experience a stall, freeing up execution resources of the processor. While one resource, such as a memory system, performs processing for the main thread (such as, for example, fetching load data from memory into a cache), other execution resources may be utilized to concurrently process instructions for the helper thread.

Execution of a helper thread may result, for instance, in placing data into a data cache so that a future cache miss in the main thread may be avoided. For at least one other embodiment, the helper thread may be utilized to perform instruction fetches into an instruction cache utilized by the main thread.

The term "helper" thread is thus used throughout this disclosure to refer to a low-overhead concurrent thread spawned in response to a user-defined trigger condition. It will be understood that the spawned thread may, for at least some embodiments, perform work unrelated to the work of the main thread. Such a thread spawned in response to a user-defined trigger condition involves relatively low overhead in relation to the main thread and executes while the main thread is also active (though the main thread may be stalled during all or a portion of the spawned thread's execution). However, for such embodiments the spawned thread performs work unrelated to the main thread's work. The term "helper" thread as used herein also encompasses such threads.

FIG. 1 illustrates that the trigger-response mechanism 120 may receive as input data information from processor event counters 110. Based on user-supplied values in an active bank of trigger-response registers 115, the trigger-response mechanism 120 determines if a response is warranted based on the contents of the event counter registers 110. If so, the trigger-response mechanism 120 may generate a synchronous response or a non-synchronous response.

FIG. 1 illustrates that the trigger-response mechanism 120 includes at least one bank of user-programmable trigger-response registers 115. For the illustrated embodiment, n sets (or "banks") of trigger-response registers 115a-115n are provided, with only one set being active at any given time. The number of registers in the bank 115 indicates the number of conditions that may be utilized by the user in specifying the trigger condition to spawn a low-overhead thread.

For example, each register can reflect a processor event, such as cycle count, cache miss, instruction opcode, etc. These trigger-response registers 115, in conjunction with event counter registers 110, support robust programmability by providing user access to several atomic events that a user might utilize to formulate a specific asynchronous trigger event. The "raw" events tracked in the trigger registers 110 may be utilized by a user, alone or in conjunction with one or more other "raw" events, to specify a trigger condition (set forth in trigger-response register bank 115) for the spawning of a helper thread. The trigger events may be synchronous or asynchronous events, and may be architectural or microarchitectural processor events.

The response generated by the trigger-response mechanism 120 may be a synchronous response or an asynchronous response. Regarding a synchronous response, the thread switch handler 130 may perform a thread switch responsive to a particular instruction in the main thread's instruction pipeline. For such occurrence, the thread switch is considered to be "synchronous" because it corresponds directly to a specific instruction in the main thread's instruction stream. For such embodiment, the thread switch is likely triggered when the trigger-response mechanism 120 detects that an opcode event counter 110 indicates that a particular opcode has been encountered. For at least one embodiment, the opcode may correspond to an instruction that does not otherwise change the processor state. For example, a noop instruction with a specific value in the immediate field may be treated as a "trigger" instruction. (Note that the immediate value may be distinct from the immediate value utilized for marking instructions, discussed below).

For at least one embodiment, the processor 101 illustrated in FIG. 1 provides architectural support for "trigger" instructions that provide the user several thread-management capabilities. Trigger instructions are supported to perform the following functions: thread creation, thread destruction, thread suspension, and thread resumption. Each of these types of "trigger" instructions has the following characteristics. First, the instruction has no side effect on the processor state. Second, the instruction's opcode is recognized by at least one of the event counter registers 110 as a trigger instruction for which a synchronous response should be generated by the trigger-response mechanism.

If such a trigger instruction reaches the execution stage of an execution pipeline, the opcode for the instruction may be detected and reported by an opcode event counter register 110. This may cause the trigger-response mechanism 120 to send a synchronous response to the thread switch handler 130, indicating that a thread switch is warranted, regardless of the state of any other processor events. For such embodiment, the thread switch handler 130 marks the return instruction pointer ("IP") address as the instruction pointer address for the triggering instruction. The switch handler advances the return instruction pointer address value, and stores the return IP address in the task queue 140. One of skill in the art will recognize that the value of the return IP address may be pre-advanced before storage in the queue 140, or may be post-advanced after the value is retrieved from the queue 140.

The task queue 140 may be any hardware storage structure. For at least one embodiment, the task queue 140 is implemented in memory. For at least one other embodiment, the task queue 140 is implemented as one or more registers. Accordingly, the return IP address may be saved in a memory location or in a register.

In contrast to the synchronous response discussed above, the trigger-response mechanism 120 may generate instead an asynchronous response. That is, the asynchronous response, indicating that a thread switch is warranted, may be based on processor events and is independent of the instruction being executed for the current thread. For at least one embodiment, the trigger-response mechanism 120 determines whether an asynchronous response is warranted in the following manner.

The processor event counters 110 track conditions that may be utilized by the user in specifying the trigger condition to spawn a low-overhead thread. For example, each register can reflect a "raw" processor event, such as cycle count, cache miss, instruction opcode, etc. The event counters 110 may be implemented as counter registers to count the various "raw" processor events. An event counter register 110 may be initialized to a number within the range of the event counter register 110, given the bit size of the register 110.

The trigger-response mechanism 120 may be programmed to detect an overflow signal from the trigger register 110 and to process the signal accordingly. For example, if a particular event counter register 110 is to detect an L3 cache miss, the counter register 110 may be initialized to a value one less than the overflow value. In such case, an overflow signal for the counter 110 is generated upon the first occurrence of an L3 cache miss. Such occurrence may be detected, and acted upon, by the trigger-response mechanism 120.

A user may program the particular state of the event counter registers 110 that will trigger a thread switch. That is, the user may utilize a special marking instruction to program the values of the trigger-response registers 115. For at least one embodiment, the marking instruction is a nop instruction with a particular immediate value. The user may utilize this instruction in a user program to be executed by the processor 101. When the marking instruction of the user program reaches the execution stage of an execution pipeline for the processor 101, the trigger-response registers 115 are modified accordingly. This action effectively puts the trigger-response mechanism 120 "on notice" to monitor for the desired thread-switch trigger event specified by the user.

For at least one embodiment, the trigger-response mechanism 120 provides an asynchronous response to the thread switch handler 130 if the thread-switch trigger event is detected. For the situation that the triggering condition, as indicated by the trigger-response registers, is met, then the thread switch may occur at any point in the main thread's execution stream. In this sense, the thread switch is asynchronous because it is not correlated with any particular instruction in the main thread stream but rather may occur asynchronously from the main thread's progress.

At least one embodiment of the trigger-response mechanism 120 monitors for only one thread-switch trigger event at a time. For example, if two marking instructions are executed, only one may be processed by the trigger-response mechanism 120 at a time. For such case, there may be multiple thread-switch trigger conditions indicated in each of a plurality of trigger-response register banks 150a-150n, but only one of the banks is active at any given time. A timeout feature may be implemented such that the trigger-response mechanism 120 monitors for a first thread-switch trigger event for only a specified amount of time (which may be measured, for example, by number of elapsed cycles or number of retired instructions). If the thread-switch trigger event is not detected within the allotted time frame, then the next thread-switch trigger event may be processed.

Figure 2:
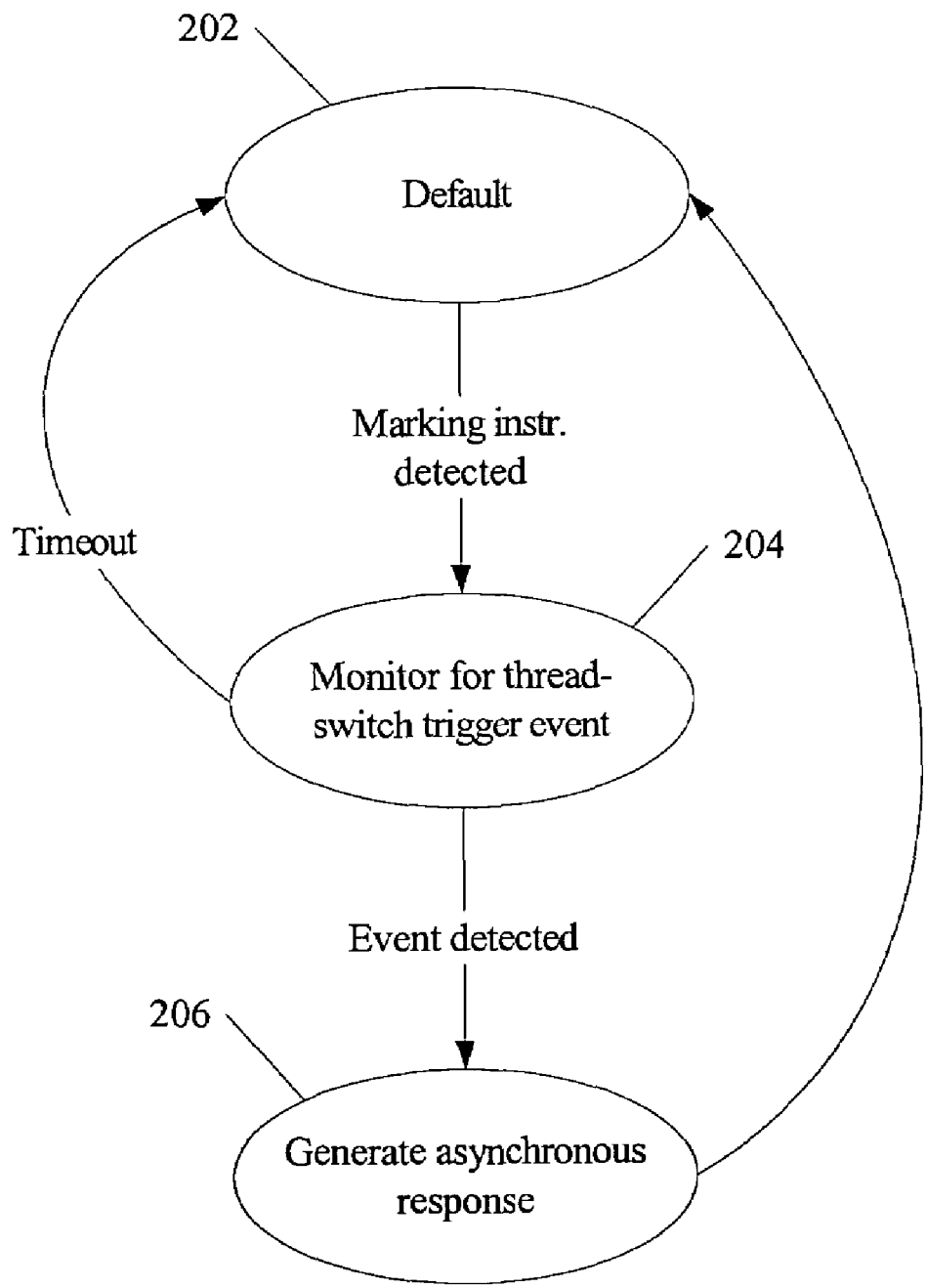
FIG. 2 is a state diagram illustrating the states of at least one embodiment of a trigger-response mechanism.

Brief reference to FIG. 2, along with FIG. 1, illustrates an example of the timeout feature. FIG. 2 is a state diagram illustrating the transition of the trigger-response mechanism 120 through the states 202, 204, 206 of a single-event detection scheme. For purposes of discussing FIG. 2, it is assumed for purposes of example that a first marking instruction indicates that a thread switch should occur upon an L3 cache miss. FIG. 2 illustrates that, prior to execution of the marking instruction, the trigger-response mechanism 120 is in a default state 202.

When the marking instruction is received, the trigger-response mechanism 120 transitions to a detection state 204. Upon entry into the detection state 204, the values in the active trigger-response register bank 115 are modified accordingly. For the cache miss example, the trigger-response register bank 115 is programmed, according to the marking instruction, to generate an asynchronous thread switch response if an L3 cache miss is reported via the event counters 110. Also upon entry into the detection state 204, the timeout period begins.

During the detection state 204, the trigger-response mechanism 120 monitors whether the specified thread-switch trigger condition is met. If the condition is not detected prior to completion of the specified timeout period, then a timeout has occurred. The timeout causes transition back into the default state 202.

Timeout may occur, for our example, if no L3 miss counter overflow indication from the appropriate event counter 110 is indicated within a specified number of cycles. Similarly, a timeout may occur if a certain number of instructions has retired since the detection state 204 was entered. In such case, it is likely that the memory accesses of interest have hit in the cache. In such case, the trigger-response mechanism 120 is restored to the default state 202 and is then ready to receive the next marking instruction.

If a second marking instruction has already been executed, such that a second bank of trigger-response registers 115 is available to be activated, the trigger-response mechanism 120 may transition back to the detection state 204 in order to monitor for the second specified thread-switch trigger event.

Otherwise, the trigger-response mechanism 120 remains in the default state 202 until another marking instruction is executed.

FIG. 2 illustrates that if the trigger-event mechanism 120 detects during the detection stage 204 that the specified thread-switch trigger event has occurred, the trigger response mechanism 120 transitions to state 206. At state 206, the trigger-response mechanism 120 indicates to the switch handler 130 that a thread switch should occur. The trigger-event mechanism then transitions back to the default state 202.

Returning to FIG. 1, FIG. 1 illustrates that the response (either synchronous or asynchronous) generated by the trigger-response mechanism 120 may be received by the thread switch handler 130. The thread switch handler 130 provides minimal save/restore processing for a spawned thread. When the response from the trigger-response mechanism 120 indicates that a thread switch is appropriate, the thread switch handler 130 saves minimal context information for the current thread before switching to another thread. The minimal context information may be saved in a queue 140. Depending on the implementation of the queue 140, as discussed above, the minimal context information mat by saved in one or more registers, or it may be stored in memory.

For at least one embodiment, the instruction pointer (IP) address for the current thread is the only context information saved in the queue 140 before switching to another thread. For at least one other embodiment, however, additional context information may be saved. Control registers 150 indicate to the switch handler 130 which information is to be saved in the queue 140 upon a context switch.

The helper thread(s) spawned from a main thread are "low-overhead" thread in the sense that the hardware maintains relatively little context information upon a thread switch, relative to the amount of context information maintained for the main thread by the processor. Other traditional context information, such as general register values, is excluded from the minimal context information saved for low-overhead thread switches. A thread for which only minimal information is saved by the hardware, such as the embodiment illustrated in FIG. 1 (e.g., instruction pointer (IP) address may be the only context information saved in the queue 140), may be alternatively referred to as a "low-overhead thread," "flyweight thread," "thin thread," or "fiber."

For at least one embodiment, it is assumed that software in which the user has specified a thread-spawning trigger event is responsible for managing other architectural state information that is not maintained in the queue 140. One will note that, because the thread switch is explicitly programmed by a user, the thread switch occurs based on user program interaction with the hardware; thread creation for such embodiment is not handled by the operation system. For at least one embodiment, for example, it is assumed that the compiler explicitly manages the additional context information for a low-overhead thread via register partitioning. The low-overhead thread switches are transparent to the operating system.

A side-effect of the user-programmable low-overhead multithreading scheme discussed above is that thread switches may efficiently occur more frequently, and with smaller granularity, than traditional multithreading context switches. The low overhead associated with such a context switch may be amortized and recouped over a relatively small quanta. For example, the granularity for a low-overhead context switch as described herein may be around 200 machine cycles. In contrast, granularity for an operating system-supported context switch for traditional multithreading may be many milliseconds. In terms of computing efficiency, this difference is notable—a millisecond may represent millions of machine cycles.

Figure 3:
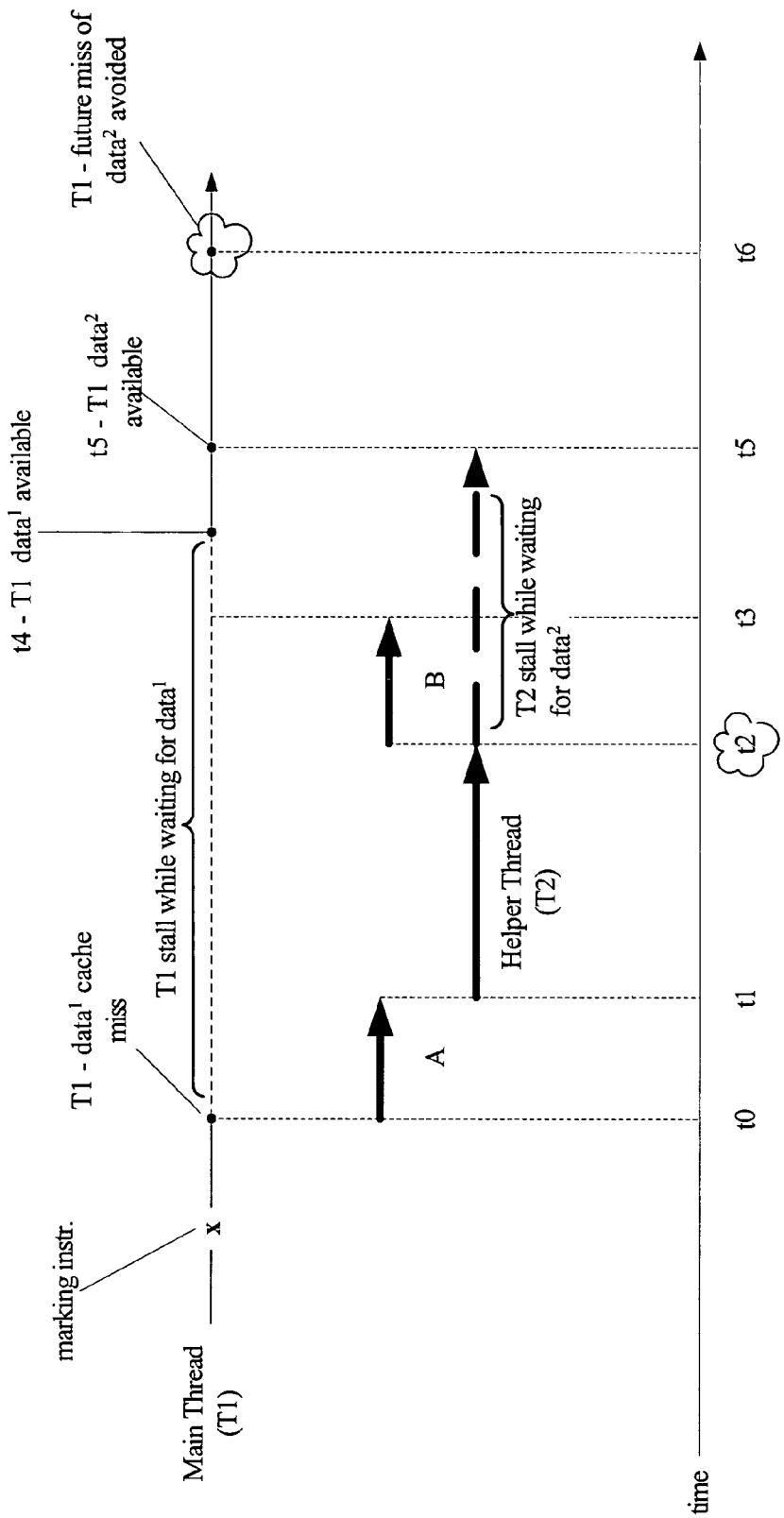
FIG. 3 is a timeline illustrating asynchronous spawning of a low-overhead helper thread to perform data pre-fetching during a main thread cache miss stall.

FIG. 3 is a timeline illustrating an example sequence of events according to an asynchronous usage model of the programmable low-overhead multithreading scheme discussed above. For the asynchronous usage model illustrated in FIG. 3, a main thread T1 includes a marking instruction to indicate that a thread switch should occur upon an L3 cache miss during execution of the main thread T1. The marking instruction, x, is executed before time t0, which alerts the trigger-response mechanism 120 (FIG. 1) to monitor for the user-specified thread-switch trigger event (that is, to monitor for an L3 cache miss).

FIG. 3 illustrates that an L3 cache miss occurs at time t0. The cache miss causes execution of the main thread (T1) to stall until the missed data is retrieved from memory. FIG. 3 illustrates that this stall occurs from time t0 until time t4.

FIG. 3 illustrates that the cache miss at time t0 also triggers the trigger-response mechanism 120 (FIG. 1) to initiate a low-overhead context switch such that a helper thread, T2, is asynchronously spawned. The context switch begins at time t0 and completes at time t1, at which time the helper thread T2 begins execution. Accordingly, time span A in FIG. 3 illustrates the time it takes to transfer control from the main thread T1 to helper thread T2.

For the embodiment illustrated in FIG. 3, the helper thread T2 executes a precomputation slice of instructions for a future main thread (T1) instruction, where the future main thread instruction is anticipated to incur a cache miss. That is, through profiling or other means it has been determined, for example, that the instruction at t6 is anticipated to generate performance loss due to a cache miss on a load instruction during execution of the main thread T1. Thus, during the stall for the cache miss experienced by the main thread at time t0, the helper thread pre-fetches data into a data cache in hopes to avoid a later anticipated cache miss (at time t6) in the main thread (T1).

The precomputation slice executed by the helper thread T2 from time t1 up to time t2 is the smallest subset of main thread instructions necessary to precompute the address of the target load instruction anticipated to cause a cache miss in the main thread T1 at time t6. After executing the precomputation slice, the helper thread executes the target load instruction. FIG. 3 illustrates that the target load instruction is executed at time t2.

For at least one embodiment, the user may place a trigger instruction after the target load instruction in the helper thread code in order to indicate that the thread has completed execution and that the main thread T1 may resume control. The trigger instruction may be an asynchronous or synchronous instruction. For at least one embodiment, both a synchronous and asynchronous instruction may be placed at the end of the helper thread T2.

FIG. 3 illustrates that, at time t2, a context switch is initiated after completion of the target load instruction. (As is stated above, this context switch may be initiated by a trigger instruction placed in the helper thread instruction stream after the target load instruction.) FIG. 3 illustrates that the context switch is completed at time t3. Accordingly, time span B in FIG. 3 illustrates the time it takes to transfer control from the helper thread T2 back to main thread T1.

Although the context switch has been completed at time t3, the main thread T1 is still stalled waiting for the load data$^1$, data, requested at time time0. FIG. 3 illustrates that the load data, data$^1$, is returned at time t4, at which time the main thread T1 becomes unstalled and resumes execution of instructions.

Meanwhile, the helper thread T2 is stalled from the time its target load instruction is issued at time t2 until such load data, data$^2$, is returned from the memory system at time t5.

After resuming control at time t3, the main thread T1 thus continues execution of its instruction stream, eventually reaching the load instruction at time t6. Because the data for this load instruction, data$^2$, was pre-fetched by the helper thread and placed in the cache at time t5, a cache miss in the main thread T1 is avoided at time t6.

Figure 4:
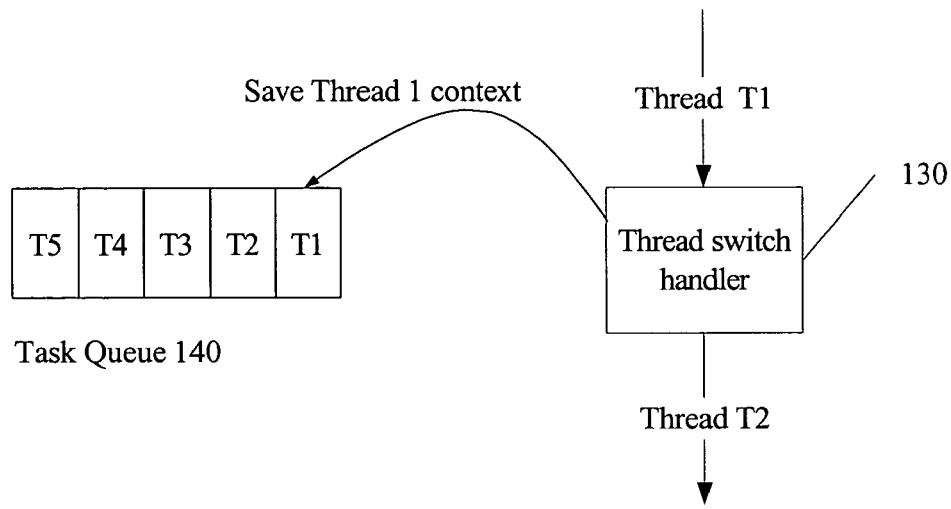
FIG. 4 is a data flow diagram illustrating the saving and restoring of context information during two sample context switches.
Figure 4:
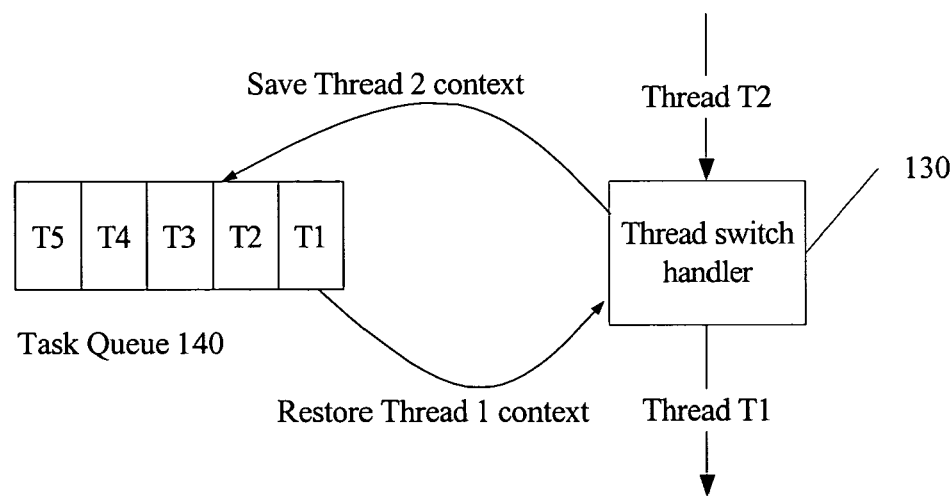

FIG. 4 illustrates thread switch handler 130 processing during the context switches shown at A and B in FIG. 3. At the time before context switch A is initiated at time t0, main thread T1 is the active thread. FIG. 4 illustrates that main thread T1 is the active thread going into switch handler 130. The switch handler 130 performs the low-overhead context switch by saving context information in the task queue 140. Also, during the context switch the switch handler 130 sets the processor's instruction pointer to the first instruction of the helper thread T2. For example, the switch handler 130 may obtain the T2 instruction pointer value from a pre-designated memory location or from a register. Thereafter, the processor continues execution of the helper thread T2's instructions.

For context switch B illustrated in FIG. 3, FIG. 4 illustrates that the helper thread T2 is the active thread before the time that context switch B is initiated at time t2. Thus, helper thread T2 is the active thread going into the switch handler 130 at time t2. During context switch B, the switch handler 130 saves the context information for thread T2 in the task queue 140 and restores to the processor's instruction pointer from the T1 context information that was stored in the task queue 140 during the prior context switch. Thereafter, the processor continues execution of the main thread T1's instructions.

Figure 5:
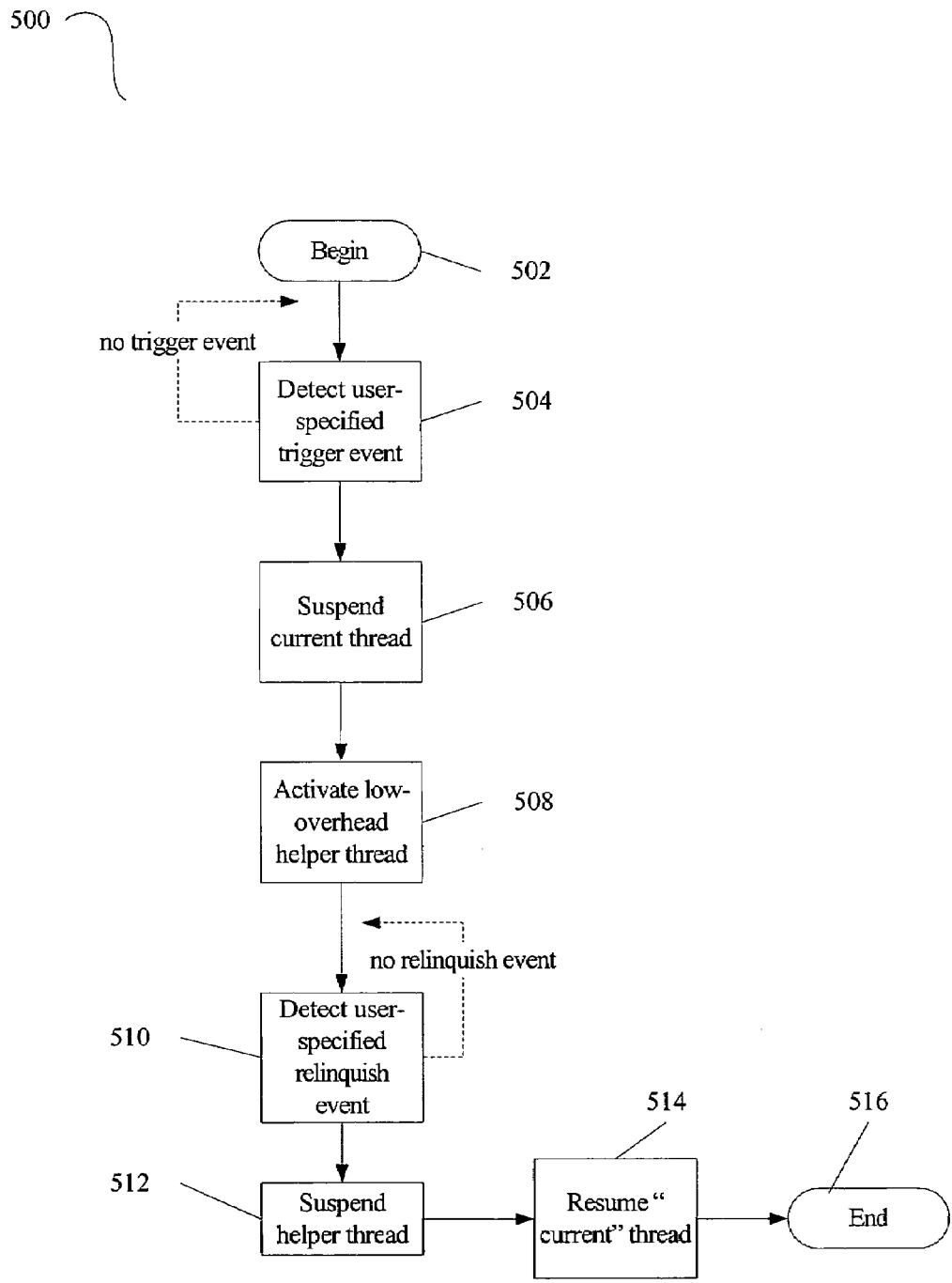
FIG. 5 is a flowchart illustrating a method for providing user-programmable low-overhead multithreading.

FIG. 5 is a flowchart illustrating at least one embodiment of a method 500 for performing user-programmable multi-threading. For at least one embodiment, the method is performed without intervention of the operating system and is transparent to the operating system. The capability for a user to directly trigger the processing illustrated in FIG. 5 may be provided by a compiler, which may provide a thread-generation driver as part of a run-time library.

FIG. 5 illustrates that processing for the method 500 begins at block 502 and proceeds to block 504. At block 504, hardware, such as the trigger-response registers 115 illustrated in FIG. 1, detects a user-specified thread-switch trigger condition. The condition may be synchronous (such as execution of an explicit trigger instruction) or asynchronous (such as a condition indicated by a marking instruction). If no trigger condition is detected, processing loops back to block 502. Responsive to detecting a trigger event at block 504, processing proceeds to block 506.

At block 506, hardware (such as, for example, switch handler 130 illustrated in FIG. 1) suspends execution of the current thread. The current thread is, for at least one embodiment, a full context main thread. Suspension may include saving minimal context information for the current thread in a task queue, such as task queue 140 illustrated in FIG. 1. The user may program the weight, or amount, of context information saved at block 506. A compiler or similar tool may maintain additional context information that is not maintained by the hardware (sometimes referred to herein as "excluded" context information).

Processing then proceeds to block 508, where a low-overhead helper thread is activated. For at least one embodiment, the helper thread is activated by hardware, such as the switch handler 130, that places the beginning instruction pointer address for the helper thread instruction stream into the processor's instruction pointer register. From block 508 processing ends proceeds block 510.

At block 510 hardware, such as the trigger-response registers 115 illustrated in FIG. 1, detects a user-specified thread-switch trigger condition to cause relinquishment of the helper thread and, thus, resumption of the main thread. The condition may be synchronous (such as execution of an explicit trigger instruction to) or asynchronous (such as a condition indicated by a marking instruction). If no trigger condition is detected, processing loops back to block 510 and the helper thread continues executing. Responsive to detecting a relinquishment trigger event at block 510, processing proceeds to block 512.

At block 512, the helper thread is suspended. If the condition detected at block 510 indicates that the helper thread should be destroyed, then context information need not be saved for the helper thread. If, however, the helper thread is to be suspended, then context information for the helper thread is saved during suspension at block 512. Processing then proceeds to block 514.

At block 514, the context for the "current" thread, which was saved at block 506, is restored. Processing for the current thread then resumes, at the restored instruction pointer address. Processing then ends at block 516.

One should note that, for at least one embodiment, the context switch effected at blocks 506 and 508 and 512 and 514 is performed without intervention of an operating system.

The foregoing discussion discloses selected embodiments of an apparatus, system and method for user-programmable spawning and managing of one or more low-overhead simultaneous helper threads. The methods described herein may be performed on a processing system such as the processing system 100 illustrated in FIG. 1.

FIG. 1 illustrates an embodiment of a processing system 100 that may utilize disclosed techniques. System 100 may be used, for example, to execute one or more methods for providing user-programmable multithreading, such as the embodiments described herein. For purposes of this disclosure, a processing system includes any processing system that has a processor, such as, for example; a digital signal processor (DSP), a microcontroller, an application specific integrated circuit (ASIC), or a microprocessor. System 100 is representative of processing systems based on the Itanium® and Itanium® 2 microprocessors as well as the Pentium®, Pentium® Pro, Pentium® II, Pentium® III, and Pentium® 4 microprocessors, all of which are available from Intel Corporation. Other systems (including personal computers (PCs) having other microprocessors, engineering workstations, personal digital assistants and other hand-held devices, set-top boxes and the like) may also be used. At least one embodiment of system 100 may execute a version of the Windows™ operating system available from Microsoft Corporation, although other operating systems and graphical user interfaces, for example, may also be used.

Processing system 100 includes a memory system 150 and a processor 101. Memory system 150 may store instructions 140 and data 141 for controlling the operation of the processor 101. Memory system 150 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 150 may store instructions 140 and/or data 141 represented by data signals that may be executed by the processor 101.

In the preceding description, various aspects of a method, apparatus and system for implementing user-programmable multithreading are disclosed. For purposes of explanation, specific numbers, examples, systems and configurations were set forth in order to provide a more thorough understanding. However, it is apparent to one skilled in the art that the described method and apparatus may be practiced without the specific details. It will be obvious to those skilled in the art that changes and modifications can be made without departing from the present invention in its broader aspects. For example, the timeline shown in FIG. 3 and the method 500 illustrated in FIG. 5 may be modified to provide for multiple helper threads—a helper thread may itself spawn another helper thread. While particular embodiments of the present invention have been shown and described, the appended claims are to encompass within their scope all such changes and modifications that fall within the true scope of the present invention.

What is claimed is:

1. A processor comprising:
   event detection logic to detect a raw event;
   user-programmable event logic coupled to the event detection logic, wherein user-programmable event logic includes a user-programmable event register for storing a user-defined trigger event, the user-defined trigger event to be based on at least the raw event;
   user-programmable context control logic to specify a weight of a context to be saved;
   trigger response logic coupled to the user-programmable event logic and the event detection logic to monitor for the user-defined trigger event in response to receiving a user marking instruction; and
   thread switch logic coupled to the trigger response logic and the user-programmable context control logic, wherein the thread switch logic, in response to the user-defined trigger event being detected by the trigger response logic, to save a portion of a first context based on the weight of a context to be saved that is specified in the user-programmable context control logic and to switch the portion of a helper thread context with the portion of the saved first context without operating system intervention.

2. The processor of claim 1, wherein the user-defined trigger event is programmed in the user-programmable event register in response to execution of the user marking instruction.

3. The processor of claim 2, wherein the trigger response logic is to monitor for the user-defined trigger event for a predetermined timeout period after execution of the user-marking instruction.

4. A system comprising:
   a processor including event detection logic to detect a raw event; user-programmable event logic coupled to the event detection logic, said user-programmable event logic includes a user-programmable event register for storing a user-defined trigger event, the user-defined trigger event to be based on at least the raw event; user-programmable context control logic to specify a weight of a context to be saved; trigger response logic coupled to the user-programmable event logic and the event detection logic to monitor for the user-defined trigger event in response to receiving a user marking instruction; and thread switch logic coupled to the trigger response logic and the user-programmable context control logic, the thread switch logic, in response to the user-defined trigger event being detected by the trigger response logic, to save a portion of a first context based on the weight of a context to be saved that is specified in the user-programmable context control logic and to switch the portion of a helper thread context in place of the portion of the saved first context without operating system intervention; and a system memory to be associated with the processor, the system memory to hold code for the helper thread.

5. The system of claim 4, wherein the user-defined trigger event is to be programmed in the user-programmable event register in response to execution of the user marking instruction.

6. The system of claim 5, wherein the trigger response logic is to monitor for the user-defined trigger event for a predetermined timeout period after execution of the user-marking instruction.

7. A storage device including program code, which when executed by a machine, caused the machine to perform the operations of:

defining a user-defined trigger event based at least on a raw event of a processor in the machine by user-programmable event logic of the processor, wherein the user-programmable event logic includes a user-programmable event register;

defining a weight of a context to be switched in user-programmable context logic in the processor;

monitoring for the user-defined trigger event utilizing trigger response logic in response to executing a user-marking instruction in the program code; and in response to detecting the user-defined trigger event with the trigger response logic:

saving a portion of a first context based on the weight of the context to be switched defined in the user-programmable context logic; and switching the portion of the first context with the portion of a helper thread context without operating system intervention.

8. The storage device of claim 7, wherein the user-defined trigger event is to be programmed in the user-programmable event register in response to execution of the user marking instruction.

9. The storage device of claim 6, wherein the trigger response logic is to monitor for the user-defined trigger event for a predetermined timeout period after execution of the user-marking instruction.

10. A computerized method comprising:

defining a user-defined trigger event based at least on a raw event of a processor in the machine by user-programmable event logic of the processor, wherein the user-programmable event logic includes a user-programmable event register;

defining a weight of a context to be switched in user-programmable context logic in the processor; and monitoring for the user-defined trigger event utilizing trigger response logic in response to executing a user-marking instruction in the program code; and in response to detecting the user-defined trigger event with the trigger response logic:

saving a portion of a first context based on the weight of the context to be switched defined in the user-programmable context logic; and spawning a helper thread context by switching the portion of the helper thread context with the portion of the saved first context without operating system intervention.

11. The computerized method of claim 10, wherein the user-programmable event logic includes at least a user-programmable event register, and wherein the user-defined trigger event is to be programmed in the user-programmable event register in response to execution of the user marking instruction.

12. The computerized method of claim 11, wherein the trigger response logic is to monitor for the user-defined trigger event for a predetermined timeout period after execution of the user-marking instruction.

* * * * *

UNITED STATES PATENT AND TRADEMARK OFFICE
CERTIFICATE OF CORRECTION

PATENT NO. : 7,631,307 B2 Page 1 of 1
APPLICATION NO. : 10/728649
DATED : December 8, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1394 days.

Signed and Sealed this

Twenty-first Day of December, 2010

David J. Kappos
*Director of the United States Patent and Trademark Office*